Figure 1:
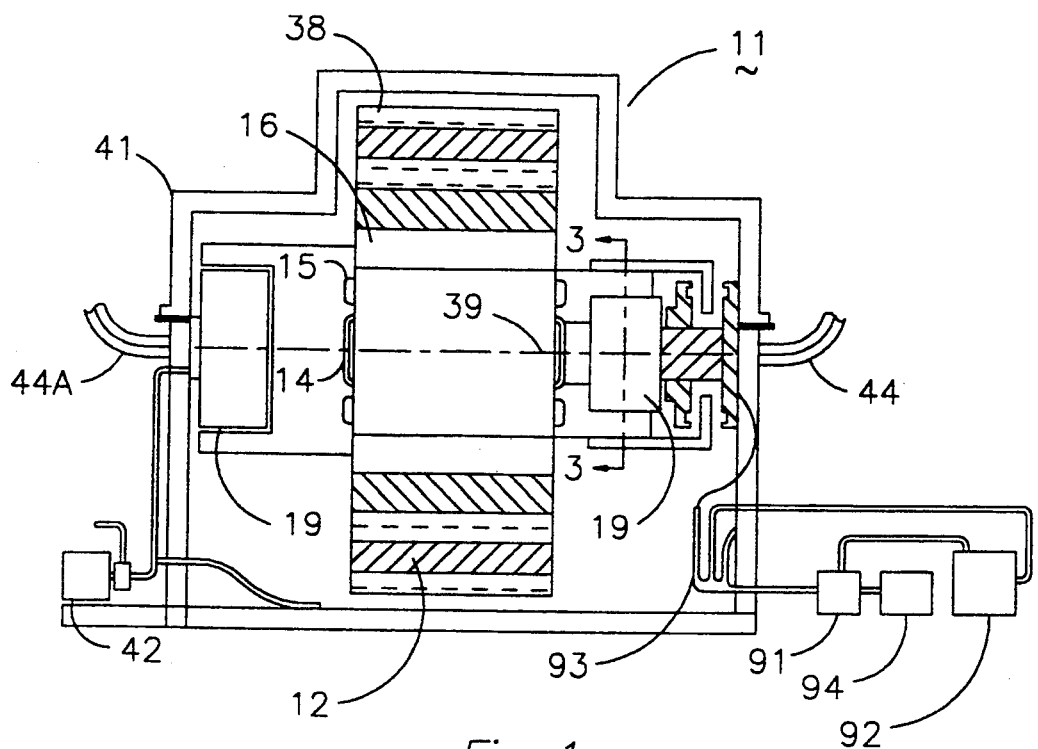

United States Patent [19]

Lewis

[11] Patent Number: 5,398,571

[45] Date of Patent: Mar. 21, 1995

[54] FLYWHEEL STORAGE SYSTEM WITH IMPROVED MAGNETIC BEARINGS

[76] Inventor: David W. Lewis, P.O. Box 108, Ivy, Va. 22945

[21] Appl. No.: 105,623

[22] Filed: Aug. 13, 1993

[51] Int. Cl.⁶ .......................... H02K 7/02; H02K 7/09
[52] U.S. Cl. ........................... 74/572; 310/90.5; 318/632
[58] Field of Search .................. 74/572, 573 R, 574, 74/604; 310/90.5, 74; 318/632, 629, 150, 161

[56] References Cited

U.S. PATENT DOCUMENTS

| | | | |
|---|---|---|---|
| 4,617,507 | 10/1986 | Eisenhaure et al. | 322/4 |
| 4,629,947 | 12/1986 | Hammerslag et al. | 310/74 |
| 5,179,308 | 1/1993 | Malsky | 310/90.5 |
| 5,216,308 | 6/1993 | Meeks | 310/90.5 |

FOREIGN PATENT DOCUMENTS 0248939 10/1989 Japan ........................... 310/90.5

*Primary Examiner*—Charles A. Marmor
*Assistant Examiner*—Troy Grabow
*Attorney, Agent, or Firm*—Leo J. Aubel

[57] ABSTRACT

A stationary flywheel energy storage system mounted to rotate in a horizontal orientation. The system includes a motor/generator wherein the rotor is positioned externally of the stator. Magnetic bearings suspend the rotor at each end thereof. Each magnetic bearing comprises a single principal actuator which supports 80% to 99% of the gravity load at that end of the rotor. Additional minor actuators, are provided to suspend the remaining portion of the load, and to compensate for dynamic unbalances.

8 Claims, 4 Drawing Sheets

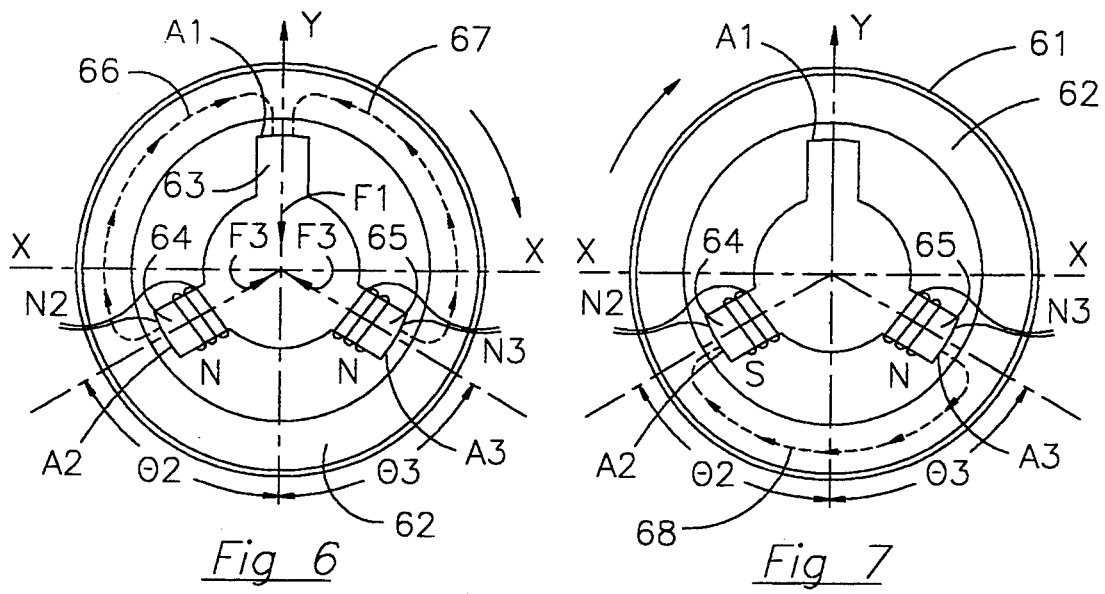
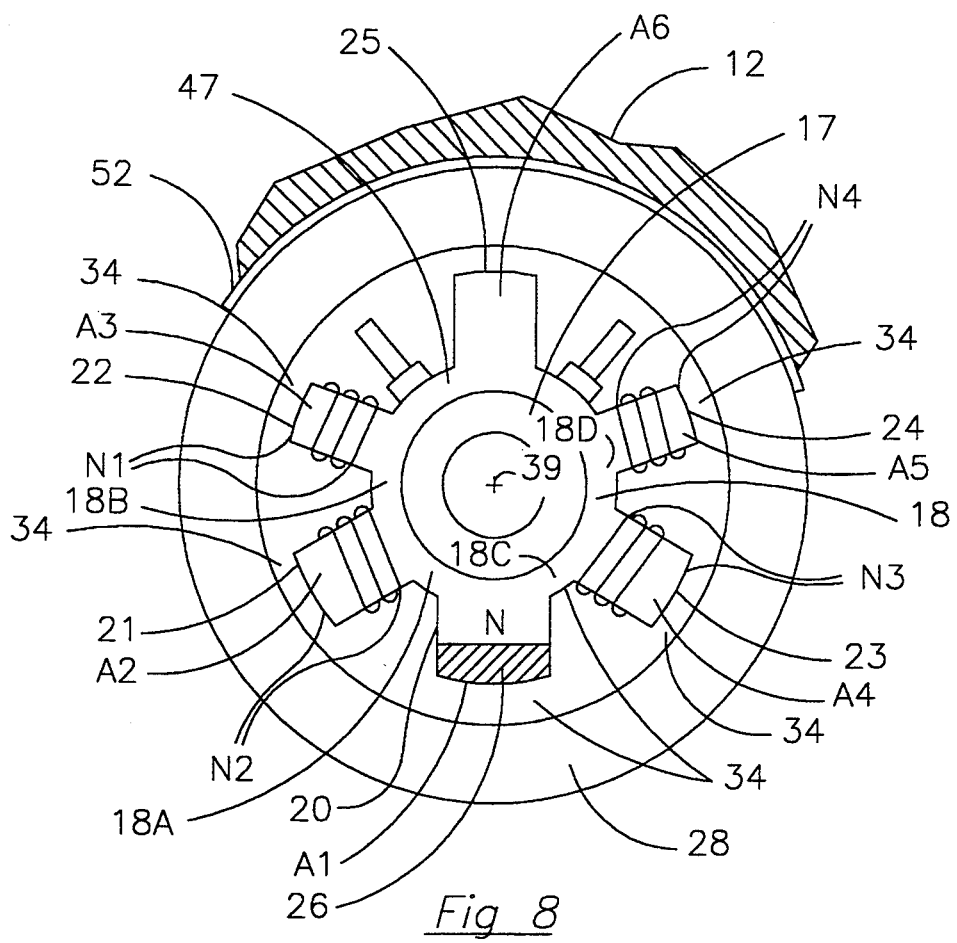

FLYWHEEL STORAGE SYSTEM WITH IMPROVED MAGNETIC BEARINGS

BACKGROUND OF INVENTION

The present invention relates to electrical energy storage systems. Electrical utilities normally are engineered to have the capability of producing more electrical power than actually required in their normal peak demand periods. This capability of providing more power, commonly approximately 17% more power, is provided to cover emergency situations.

Power companies face the problem that peak demands have increased dramatically; and since 1985, continue to grow at a rate of 3% per year. It is projected the long period of excess capacity that began in 1974 will come to an end during the decade of 1990. Additionally, environmental concerns have inhibited the building of power plants that would increase the base load capabilities. Power companies have tended to deal with the foregoing problem by installing so called "peaking units" near the areas of large power demand. The peaking units are usually gas turbine-driven generators. Such generators have high capital costs, and additionally, fuel costs for gas turbines are also high.

Various solutions have been suggested to meet the foregoing problem. One solution is to provide an energy storage system of high-efficiency and compactness, and with characteristics that allow it to be installed almost anywhere and in a short time. Several sources have suggested that flywheel storage offers the foregoing desirable characteristics. One such proposal was that of R. F. Post and S. T. Post in the article entitled *Flywheels* in the December 1973 issue of Scientific American. Some time later in an article entitled *Flywheels For Energy Storage* appearing in Technology Review, November 1979 (Vol. 82, No. 2, p 32), Alan R. Millner discussed using flywheels for energy storage for peak load shaving on electric utility systems.

More recently U.S. Pat. No. 5,124,605 issued to Bitterly et al discloses a flywheel-based energy methods and apparatus. The Bitterly apparatus has the capacity of storing electric energy as kinetic energy and generating electric energy from the stored kinetic energy. Bitterly et al discloses a system having two flywheels which rotate counterclockwise to each other. The Bitterly flywheels are provided with magnetic bearings as well as liquid balancing bearings and perform within an evacuated, protective housing.

Magnetic bearings are well known in the art and basically comprise a system wherein rotating members are supported by electromagnets. The article entitled *Design and Test of a Magnetic Thrust Bearing* by Allaire, Mikula, Banaerjee, Lewis and Imlach in the Journal Of the Franklin institute, Vol. 326, No. 6, pp 831-847, 1989 provides an indication of the state of the art of a special type of magnetic bearing as early as 1989.

The present invention is directed to an improved electromagnetic and magnetic bearing assembly for a stationary flywheel energy storage system. The term stationary refers to a system which is positioned in a given geographic location as contrasted to, for example, flywheel storage systems to be used with automobiles, trucks, buses, or space applications.

SUMMARY OF INVENTION

The present invention relates to an improved electromagnetic and permanent magnetic bearing assembly for a stationary flywheel energy storage system; said electromagnetic and permanent magnetic bearing assembly being particularly useful with flywheel systems used with electrical utility power generation and distribution systems.

The foregoing features and advantages of the present invention will be apparent from the following more particular description of the invention. The accompanying drawings, listed hereinbelow, are useful in explaining the invention.

DRAWINGS

Figure 2:
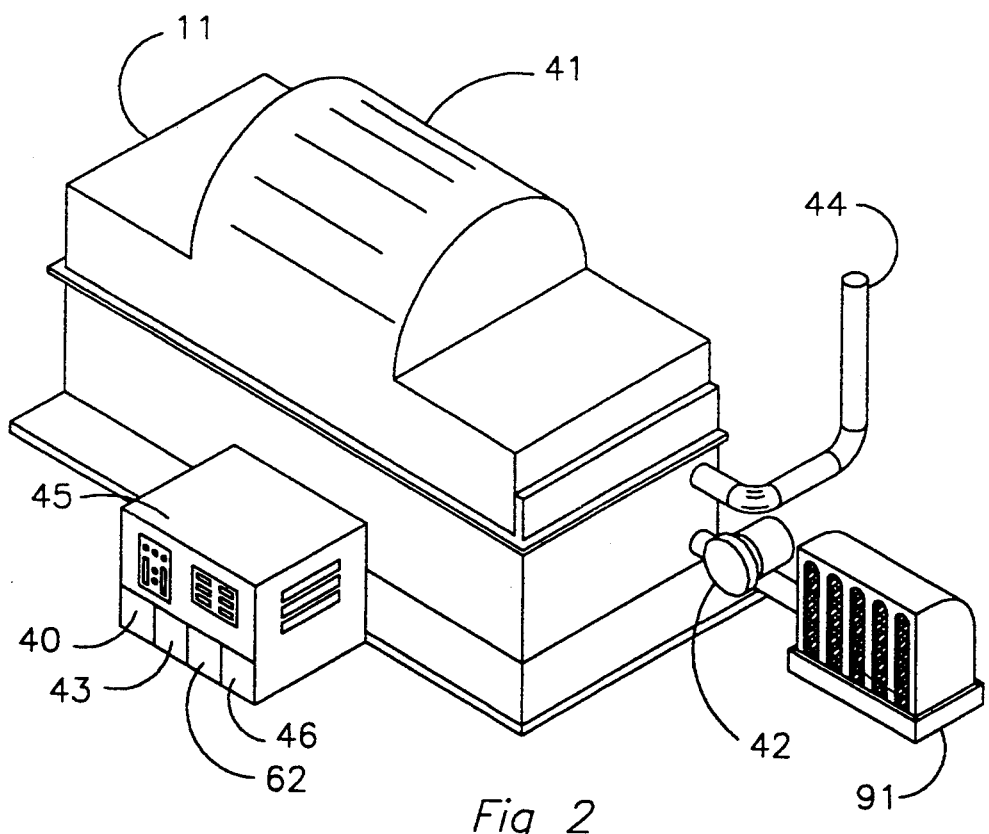
Figure 3:
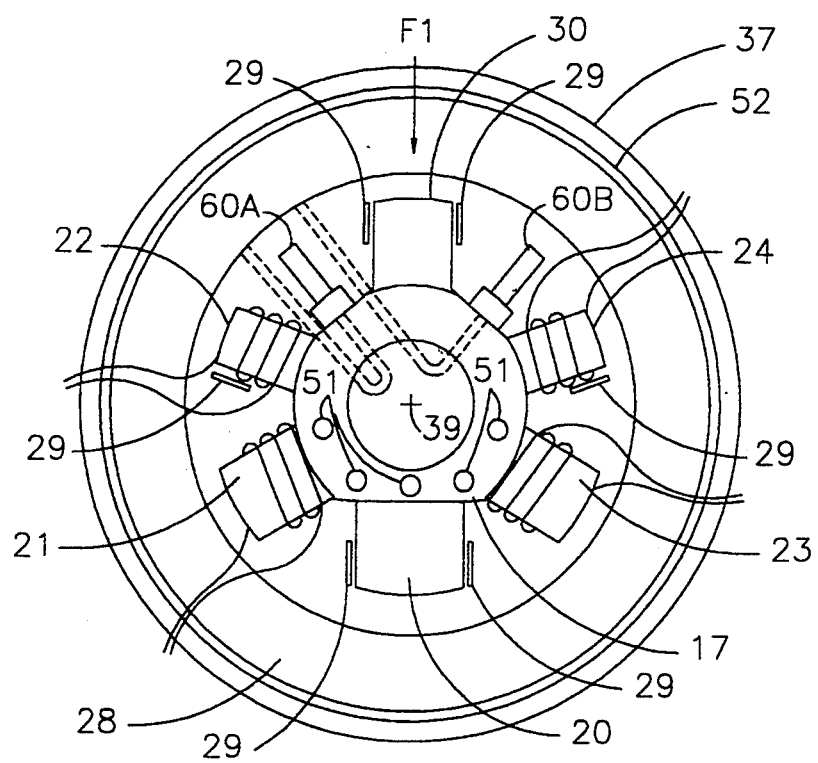
Figure 4:
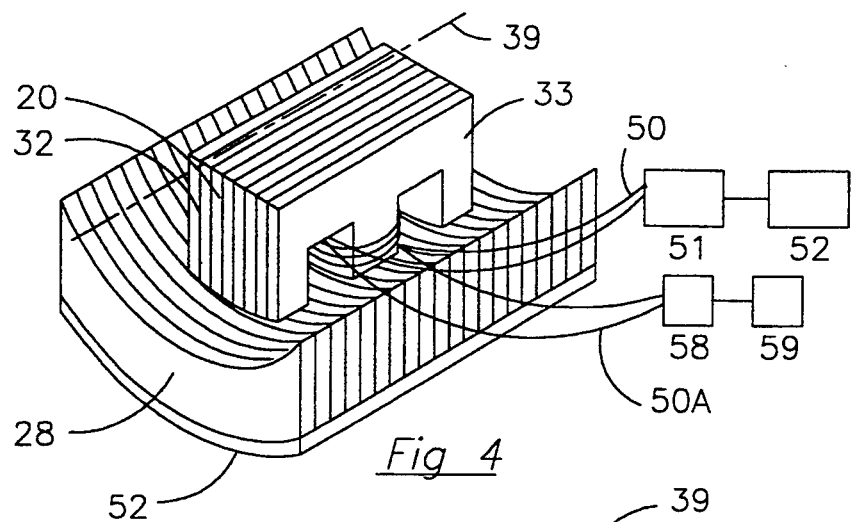
Figure 5:
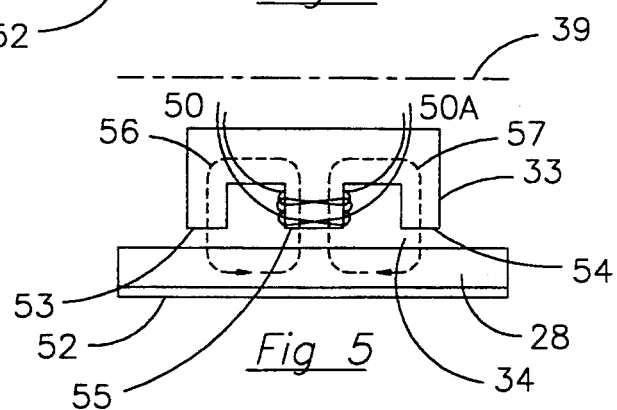

FIG. 1 is a side view of the inventive flywheel energy storage system including the electromagnetic and permanent magnetic bearing assembly, FIG. 2 is a pictorial view of the housing of the flywheel energy storage system showing certain auxiliary components of the system, FIG. 3 is a view, taken along the line 3—3 of FIG. 1, to more clearly show the orientation of electromagnetic bearing actuators for the motor/generator of the system, FIG. 4 is an isometric view of the magnet of the main actuator shown in FIG. 3 and the electrical conductor coil therefor, FIG. 5 is a side view of the magnet of FIG. 4 showing the flux lines developed therein.

Figure 9:
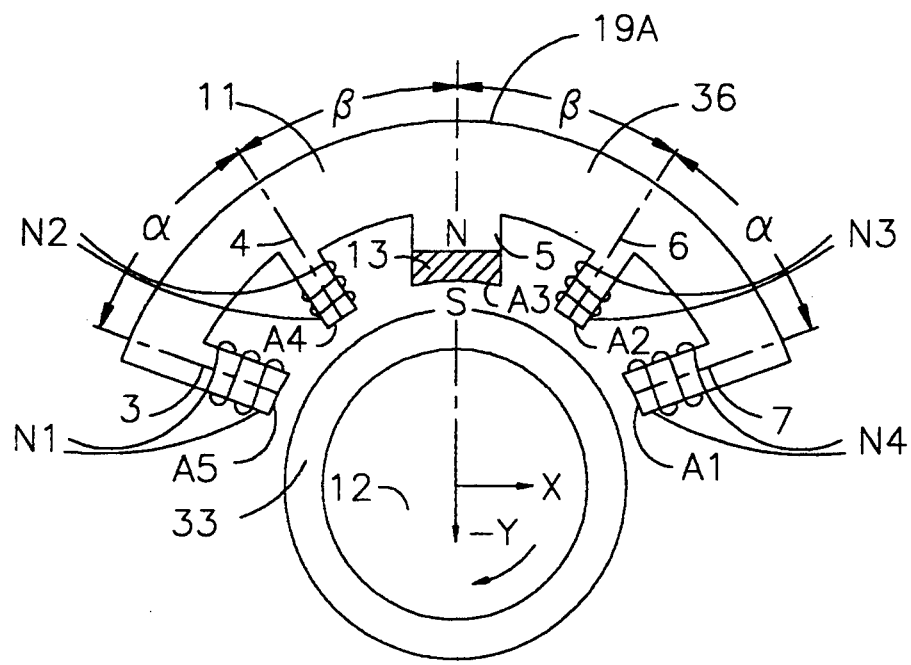
Figure 10:
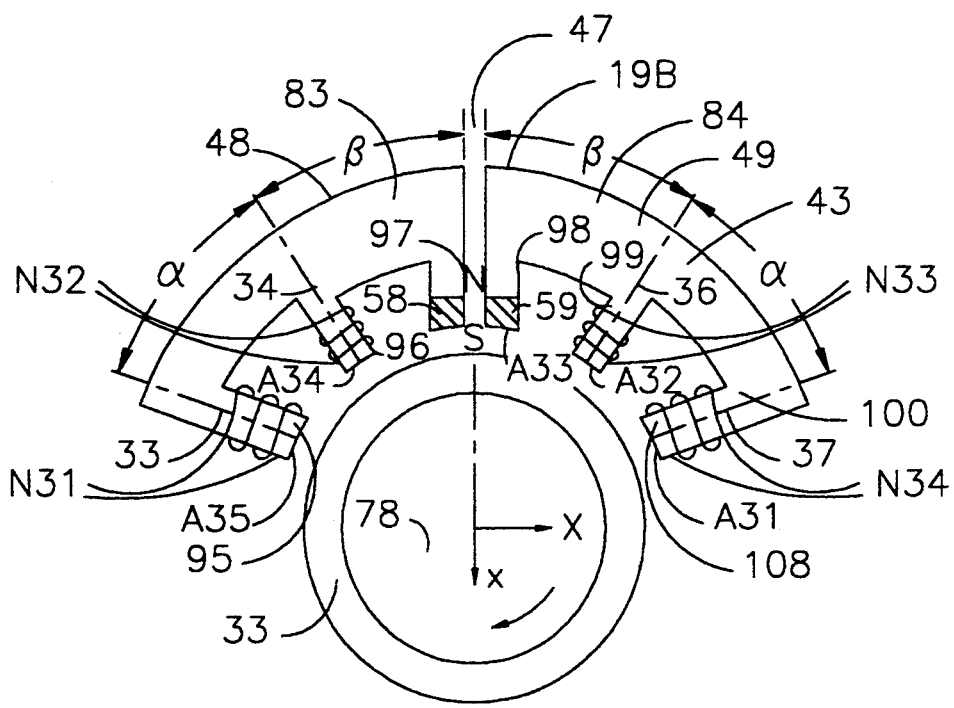

FIGS. 6 and 7 are similar views of a theoretical magnetic bearing and are useful in explaining the operations of the electromagnetic actuators of the invention, FIG. 8 is a view, partly in section, of a preferred embodiment of the magnetic bearings of the invention, FIG. 9 is a view, partly in section of a second embodiment of the magnetic bearings of the invention, and FIG. 10 is a modification of the structure of FIG. 9.

DESCRIPTION OF THE INVENTION

FIG. 1 shows a view, partly in section, of the inventive electrical energy storage system 11. The inventive energy storage system 11 is commercially referred to as the Rotating Electric Power Accumulator unit, abbreviated to the REPAC unit. For present purposes, and as shown in the drawings, the electrical energy storage system 11 includes several principal components; namely, a flywheel 12, a motor/generator 14 (hereinafter also referred to as generator 14), stator elements 15 and rotor elements 16 of the generator, two electromagnetic bearings 19. System 11 also includes a structural housing 41, vacuum pump 42, main electrical power input/output 44, and the electronic control and power cables 45 for the electromagnetic bearings 19.

FIG. 1 also shows a motor 94 driving a circulating pump 91 which forces a coolant through an external radiator 92, a heat absorbing radiator 93 in the housing 41, passageways 51 (see FIG. 3) in the stator 37 (see FIG. 3),supporting the actuators of the electromagnetic bearings 19, as will be described hereinbelow.

FLYWHEEL

The flywheel 12 is constructed of high strength, low density composite material in shaped hoops that are connected through radially soft couplings, as is known in the art.

As is apparent from FIGS. 1, 3, 4, 5 and 8, the flywheel 12 is positioned to rotate about a horizontal axis 39; this is in contrast to other known flywheel systems used with electric power generation and distribution systems wherein the flywheel is positioned to rotate about a vertical axis. As will be explained hereinbelow, the horizontal orientation of the axis of rotation 39 provides very significant advantages.

The elements which are located toward the outside periphery of the flywheel 12 will be subjected to the largest circumferential stresses. These outside elements are composed of the high strength composite material mentioned above. The journal 28 lamination (see FIG. 4) forming part of the rotor 38 which has lower strength properties, but good magnetic properties are located near the central axis of rotation 39, and are therefore subjected to a relatively smaller centrifugal force during rotation.

The present flywheel construction permits more material to be placed at the areas subjected to the higher stresses and higher speeds which optimizes the energy storing capacity of the flywheel 12; this is in accordance with the requirements of such equipment as suggested in the prior art cited above.

As shown in FIGS. 3, 4, 5 and 8, a preloading ring 52 is applied to the bearing journal 28 in an interference fit. Ring 52 is effective to provide support to journal 28 and to reduce the centrifugally induced stresses acting in the journal 28 material. Typically, the bearing journal 28 material is of silicon iron or other high magnetic flux saturation material which have good magnetic properties but which have poor mechanical stress properties. Ring 52 which is of high strength material will support the bearing journal 28 as higher stresses are developed at the higher speeds of rotation of the rotor.

MOTOR/GENERATOR

As is well known and as will be readily appreciated, the electrical energy storage system 11 of the present invention is designed to act reversibly as either a motor or a generator depending upon whether electric power is being transferred into or out of the storage system. The motor/generator 14 which comprises the means for transferring electrical energy into and out of the storage system 11 includes both electromagnets 15 and permanent magnets 16 which are integrated into the structure of the flywheel 12. For purposes of description, the flywheel 12 and the rotating elements of the generator 14, and associated structures comprise the rotor element 38.

As shown in FIGS. 1, 3 and 8 the stationary elements 37 of the motor/generator 14 are suitably mounted to housing 41 along the central axis of rotation 39. Note that in normal prior art motor and generator configurations, the rotor is mounted within the stator. As clearly shown in the various drawings, the preferred embodiment of the inventive system reverses that configuration and positions the stator elements 37 within the rotor elements 38 to obtain various advantages as will become evident.

The motor/generator 14 runs at variable speeds, and a solid state switching device 46, of suitable known type, controls the output of the motor/generator 14 so that the output electrical lines receive the conventional 60 or 50 Hertz wave form when the motor/generator 14 is functioning as a generator.

As shown in FIG. 2, a suitable computer 40 mounted in console 45 and including an electronic timer 43 functions to make decisions for the overall control of the solid state switching device 46. As is known, the computer 40 may be programmed for each specific application such as to make decisions based upon the time of day and the performance that is optimized for the motor/generator 14. As an example, if the associated installation which receives the electrical energy from the utility and from the electrical energy storage system 11 requires maximum power and the utility is already providing a high demand, the computer 40 controls the switching device 46 to cause the motor/generator 14 to function as a generator to also provide electrical energy to the installation.

As another example, during off-peak time periods, speed sensors of any suitable known design will sense the speed of the motor/generator 14, and if the speed is below the maximum designed running speed the motor function of the motor/generator 14 will be switched on, thereby coupling power from the utility to the energy storage system 11 to increase the rotating speed of the rotor 38 to store energy in the flywheel 12. As still another example, assume that at a non-peak demand time of day, computer 40 and the speed sensors 29 sense that the operating speed of the motor/generator 14 is below the maximum design running speed, but the utility is supplying a high electric load demand to the installation being served. If additional power from the utility were to be used to drive the motor/generator 14 as a motor, and this additional power would exceed the established peak power demand, then the computer 40 will transfer the storage system 11 to a standby condition. As is well known, suitable computer programs are utilized to accommodate various operating parameters of the system 11, the utility providing the electrical energy and the installation using that energy.

HYBRID ELECTROMAGNETIC BEARINGS

Refer now also to FIGS. 3, 4 and 5. FIG. 3 is a view partly in section to show the orientation of the hybrid electromagnetic bearings 19 which support, or more correctly suspend, the rotating flywheel 12 and the rotor elements. As shown in FIG. 1, two magnetic bearings 19 are provided, one at each end of the flywheel 12. As stated above the basic theory and operating characteristics of magnetic bearings are well known in the art, and will not be repeated herein.

FIG. 3 shows a series of electromagnetic actuators 20, 21, 22, 23 and 24, each comprising pole pieces or legs and coil windings; and, the bearing journal 28 of electromagnetic bearing 19. (For ease of reference the legs will also be referred to by the actuator number.) Actuator 20 is the primary actuator and is the largest of the several actuators as its principal line of action for producing a force on rotor elements 38 will be in an upward direction to compensate for the attraction of gravity which is depicted as a downwardly pointing vector F1. Two primary actuators 20 are provided, one for each radial electromagnetic bearing 19. Each actuator 20 develops sufficient upward force to suspend approximately one-half of the rotor 38 mass comprising the flywheel, and other rotating elements.

In contrast to the known prior art, in which the magnetic bearings 19 are stationary and surround the shaft 17, in this invention the bearings 19 are mounted inside of the journal 28. Also, note-that only one primary actuator 20 is needed at each end of the flywheel 19. In the known prior art, a second primary actuator would be positioned at 180 degrees from actuator 20.

FIG. 4 shows a more detailed view of actuator 20 which comprises an E-shaped magnet 32. In this embodiment, magnet 32 is laminated to reduce eddy current losses. An electromagnet 33 is formed by winding electric conductor and forming a coil 50 around the center leg of the magnet 32. Electromagnet 33 is mounted adjacent the bearing journal 28 which is contained within preloading ring 52, discussed above.

The direction and paths of the magnetic flux which is developed in the electromagnet 33 is shown in FIG. 5 by the dotted lines 56 and 57. If the area of face 55 of the center leg of electromagnet 33 is equal to the sum of the areas of faces 53 and 54 of the two outside legs, then as saturation flux density is approached, all of the faces 53, 54, and 55 will be subjected to the same flux density. This is one means for optimizing the use of the magnetic material.

The orientation of the faces 53, 54, and 55 is in the axial direction 39 of the rotor 38 to reduce the fluctuations of the magnetic polarity of the material. Thus, if the face 53 is subjected to a flux corresponding to a north magnetic pole, then the material of the bearing journal 28 at that axial position will be subject to variations in the flux density from some maximum value to zero, but will not be subjected to a range of maximum north pole flux density to a maximum south pole flux density. This reduces eddy current losses. The several electromagnetic actuator conductor coils 50 are all wound in the same relative direction. In the embodiment shown two individual electric coils 50 are formed as part of each primary actuator 20.

It will be obvious that additional coils can be wound on the outside legs of the E-shaped electromagnet. Doing so provides a way of making better use of space and permits the separation of coils which are driven by separate power amplifiers and individual controllers. The advantages of such construction will become apparent as the controller function is described hereinbelow.

As indicated in FIG. 4, a biasing power amplifier 51 and a slow slew rate controller 52, operated from the power source and controlled by computer 40, provide between 80% and 100% of the force required to suspend the rotor 38 mass. The biasing power amplifier 51 and the slow slew rate controller 52 are inexpensive and relatively uncomplicated. Since most of the force required to suspend the rotor 38 mass is provided by the biasing power amplifier 51 and slow slew rate controller 52, a second smaller power amplifier 58 and high slew rate controller 59 (also controlled by the computer 62) can handle the remaining part of the load or mass of the rotor 38. This is advantageous since the high slew rate controller 59 and the associated power amplifier 58 become considerably more expensive and complicated as size increases. The dynamic load resulting from mechanical unbalance and electrical upset unbalance, will also be handled by the smaller power amplifier 58 and controller 59.

As an example, in a prototype system having an eight ton rotor 38, two electromagnetic bearings 19 are used, and each bearing 19 and associated power amplifier 51 and controller 52 suspend 98% of four (4) tons, thereby giving the following relation:

4 tons ×2000 pounds/ton ×0.98=7840 pounds

Thus the 7840 pounds is carried by the slow system of power amplifier 51 and controller 52.

The remaining 160 pounds, a much less heavy portion, of the static load is carried by the smaller, more expensive higher slew rate system of power amplifier 58 and controller 59 which also carry and control the dynamic load of the rotating elements.

As shown in FIG. 3, actuators 21-24 are smaller than the primary actuator 20 since they are required to provide only a small portion of the upwardly directed force and a small portion of the necessary horizontal stabilizing force for the rotor 38. The actuators 21-24 also act in the horizontal direction to keep the flywheel 12 and rotor 38 in proper horizontal alignment, and concurrently compensate for small mechanical unbalance.

Further, any mechanical unbalances that develop with rotor 38 elements (FIG. 1) are counterbalanced by providing a rotating electromagnetic field which is superimposed onto the main feedback control currents in each of the electromagnetic bearings. Independent rotating fields are provided to each of the electromagnetic bearing 19. These fields are synchronized with the rotating speed of rotor 38 and simultaneously adjusted in magnitude and phase, and thus any mechanical unbalances that develop in rotor 38 are balanced out. One preferred means of providing balancing data is to sense the total amplitude of vibration the rotor 38 at each of the sensor locations 60A and 60B, see FIG. 3. Also, by having these rotating fields uncoupled from the normal feedback control currents in the actuators shown in FIG. 3 provides the advantage of eliminating any controller instability since these rotating fields are separate from the feedback circuit.

Refer now to FIG. 6, which shows a theoretical model of a hybrid magnetic bearing, for a further explanation of the operation of the inventive hybrid magnetic bearings. The term "hybrid magnetic bearings" is used herein to apply to magnetic bearings comprised of elements which have actuator poles pieces or legs exerting a magnetomotive force developed by 1) a permanent magnet or magnets, or 2) the action of electrical current passing through an electric coil, or 3) driven by the unbalanced magnetic fluxes that arise from other associated actuator pole pieces, and 4) any combination of the foregoing.

FIG. 6 shows an electromagnetic actuator having three actuator poles pieces or legs 63, 64, and 65, each leg having faces A1, A2, A3, respectively. Conductor coils N2 and N3 are wound on legs 64 and 65. Importantly note that there is no coil wound on leg 63. For explanation purposes, consider that coils N2 and N3 are activated with electric currents so as to produce a flux density of 1.0 Teslas through the legs 64 and 65. Further, consider that the direction of the current flow through the legs is such that north magnetic poles are produced at faces A2 and A3. The flux paths or magnetic lines of force 66 and 67 will extend through the magnetic journal 62 material in the direction indicated. If it is assumed that the cross sectional area of pole faces A1, A2 and A3 are the same , then the flux density at face A1 of leg 63 will be 2.0 Teslas, since the total flux from legs 64 and 65 passes through leg 63.

The force of attraction between the magnetic journal 62 material and the face A1, A2 and A3 of actuator pole pieces 63, 64, and 65 is proportional to the square of their respective flux densities. For description purposes assume that the magnetic force, indicated as F1 and, acting vertically downward will be proportional to 2.0 Teslas squared or have a magnitude of 4. Assume magnetic forces F2 and F3, are acting generally upward along the directions defined by the angles theta 2 and theta 3 will be equal to 1.0 Teslas squared, or have a magnitude of 1.0. If, as an example, angles theta 2 and theta 3 each equal 45 degrees then the upward component of forces F1 and F2 will be proportional to 1.0 times the cosine of the 45 degree angle or be 0.707 in magnitude. In FIG. 6, both vertical components of forces F2 and F3 act in the upward vertical Y direction, hence the total resulting force F-total will be given by the relation:

$$F \text{ total} = F1 - (F2 + F3) \text{ or } 4 - (0.707 + 0.707) = 2.586$$

The total resulting force F total will be acting downwardly on the magnetic journal 62 material. As mentioned above, note that only two coils N2 and N3 are required to produce this result; there is no coil on leg 63.

As can be readily understood, the resulting forces in the horizontal or X direction will be zero since the two horizontal components of the forces F2 and F3 acting through legs 64 and 65 are equal in magnitude, but opposite in direction.

FIG. 7 is similar to FIG. 6, with one significant difference. In FIG. 7, the direction of the current in coil N2 is reversed from that shown in FIG. 6 thereby causing a change in the orientation of the magnetic poles in leg 64. The face A2 is now a south magnetic pole and hence the flux path direction will be as shown in FIG. 7, passing from the north pole at face A3 into the magnetic journal 62 material and thence into the south magnetic pole at face A2. As discussed above, the magnetic forces F2 and F3 at faces A2 and A3, respectively, will be generally along the directions defined by the angles theta 2 and theta 3. Assuming a 1.0 Tesla flux density in each leg 64 and 65, the resultant force acting on the magnetic journal 62 material will be of magnitude 1.414 as determined previously. Now however, there is no additional force F1; that is, F1 32 0. Thus it can be seen that by selection of the cross-sectional areas of the pole faces A1, A2, and A3 and by controlling the direction the currents through the coils N2 and N3, the force acting on the magnetic journal 62 material can be controlled to range from 2.586 magnitude units downwardly (as discussed with reference to FIG. 6) to 1.414 magnitude units upwardly (as discussed with reference to FIG. 7).

It can thus be appreciated that by controlling the magnitudes and directions of the currents in coils N2 and N3 such that the resulting flux densities are unequal in the two legs 64 and 65, a controlled flux density will be produced in leg 63. Therefore, magnetic forces F1, F2 and F3 can be generated at the pole faces A1, A2 and A3 which may be adjusted according to control algorithms, executed by a suitable computer, to control power amplifiers connected to the two conductor coils N2 and N3.

The important significance of the foregoing is that a resulting magnetic force may be produced which can act in any radial direction. With the inventive configuration, a component of force of a prescribed value may be caused to selectively act in the positive or negative X or horizontal direction; and, simultaneously, a component of force of a different prescribed value may be caused to selectively act in the positive or negative Y or vertical direction.

The inventive system thus utilizes a hybrid magnetic bearing system to provide control forces in the X-direction and Y-direction through a) some actuators having two separate windings, b) through some actuators having no windings, and c) through some actuators having permanent magnets and further programmed to provide for a rotating force vector (at shaft speed) for automatic compensation of rotor unbalances. More specifically, magnetic fields are generated to provide controlled compensation of gravity forces and of rotor unbalances a) through computer control means, b) proper geometric selection of the various cross-sectional areas of the actuator pole pieces or legs, c) selected magnetic paths through the back iron, d) use of permanent magnets in some actuator legs, e) selection of the geometry and material of the magnetic rotor, and f) through rotating magnetic fields generated to provide controlled compensation of rotor unbalances.

Refer now to FIG. 8 which shows a cross sectional view, similar to FIG. 3, of the preferred embodiment of the inventive hybrid magnetic bearing 19. Bearing 19 includes a support shaft 17 and silicon steel journal 28 formed of laminations or shims (to minimize eddy currents) which extend in the axial direction and are longer than the axial length of the actuator pole pieces or legs 20–25. Legs 20–25 have pole faces A1–A6, respectively, which have areas of different cross-section. Back iron 18 is preferably of a composite material such as well known Hiperco 50, but it may also be of solid or laminated silicon steel.

A permanent magnet 26 is positioned to have a magnetic north pole orientation as shown in the drawing, but it may also be positioned in a reverse or opposite polarity. The stationary shaft 17 is of any suitable steel or steel composite, and is cylindrical in shape. The series of thin magnetic silicon steel lamination 47 in the form of thin washers are pressed onto the shaft 17 with an interference fit. There is a gap or clearance 34 between the pole faces A1–A6 and the surface of journal 28, as shown in the various drawings.

The gap or clearance 34 at a given point or surface is obtained, for example, by the relation R7–R1 for actuator 20, and as R3–R2 for actuator 22, etc. (R7 is the distance from centerline 39 to the inner surface of journal 28, and R1 is the distance from centerline 39 to face A1; R3 is the distance from centerline 39 to the inner surface of journal 28, and R2 is the distance from center line 39 to face A3). The feature of importance is that the gap or clearance 34 formed between the surfaces of the various actuators A1–A6 and the journal 28 vary. These variations in clearance are provided to obtain the advantage of having different "spring stiffness" of the magnetic bearings in the X and Y (horizontal and vertical) directions, and thereby enabling the actuators to obtain different allowable motion of the rotating system in the X and Y directions.

The actuator leg 20 has a pole face A1 with a across-sectional area determined by the width (X) dimension multiplied by the axial or depth (Z) dimension. In the embodiment of FIG. 8, the radial lengths of the legs 20–24 are the same, but their cross-sectional areas are different. Further, leg 20 is different from the other legs and is somewhat longer in the axial or Z direction in order to accommodate the permanent magnet unit 26. The permanent magnet 26, which may consist of stacked sections, is selected to cause the flux density in leg 20 to be near the saturation level.

The cross-sections of the back iron 18 at selected sections will differ whereby different levels of flux will be required to produce magnetic flux saturation in the several selected sections.

The flux paths produced by the permanent magnet 26 may be traced as follows: the flux from magnet 26 flows through leg 20 and divides into two paths in the back iron 18. One path flows through back iron section 18A where the path again divides into two paths, with one path passing through leg 21, face A2, across gap 34 into the journal 28 and then returning to the permanent magnet 26 at face A1. The second path of the flux continues through the back iron section 18B, through leg 22 and face A3, across clearance 34 into the journal 28 and returns to the permanent magnet 26 through face A1.

Similarly, two paths may be traced to the right side of magnet 26; the first has a path from magnet 26, leg 20, back iron section 18C, leg 23, face A4, gap 34, journal 28, and back to face A1 and magnet 26. As above, a second path is through back iron section 18D, leg 24, gap 34, journal 28 and back to face A1.

For set-up purposes, zero currents are supplied to the coils N1, N2, N3 and N4; that is, there is no electromagnetic energy developed. The flux at the pole faces A1, A2, A3, A4 and A5 produced by the permanent magnet 26 is selected so that the component of the magnetic force acting in the upward Y direction is somewhat less than the "dead weight" of the rotating system but such that the permanent magnet 26 will almost support the rotating system to provide the selected clearances 34. The value of the magnetic force is determined by subtracting the maximum expected unbalanced force of the system from the "dead weight". The value need not be determined precisely because the dynamic response of the rotating system is controlled, in part, by the translatory inertia in the X and Y directions of the rotating system which produces a delay or phase shift between the actual translatory motion and the rotating unbalanced force.

By supplying a current to one of the actuators, for example, actuator leg 21, two different operating results can be obtained. A first result is obtained when the current supplied to the coil winding N2 is in a direction to produce a flux in leg 21 which aids, or adds to, the flux being produced by the permanent magnet 26; the resulting magnetic force through leg 21, acting on the rotating system in the radial direction, will be increased. The total magnetic force will be related to the instantaneous sum of the components forces in both the X and Y directions, in turn related to the angles, that is the position, of the legs 21 relative to the leg 20, and its vertical orientation.

A second result is obtained when the current supplied to the coil N1 is in a direction to produce a flux in leg 21 which opposes, or subtracts from, the flux being produced by the permanent magnet 26 in actuator leg 20. In this latter case, the total flux in leg 21 will be reduced thereby diminishing the effectiveness of leg 21 in providing a magnetic force.

The actual sum of the individual actuator activations and the magnetic force developed provides rotor system control. By recursive analysis of each electromagnetic actuator done separately, a matrix of possible force combinations is obtained regarding each, as well as the total, actuator activation.

Note that the current supplied to leg 21 yields a change in the fluxes passing through the legs 22-25 which can be determined since the reluctance of the legs 22-25 is known. The permanent magnet 26 also provides a flux path, however its conductance is low in comparison with the higher conductance of the material such as Hiperco of which the system is constructed.

In addition to the magnetic force combinations developed by the magnet 26 and electromagnets on legs 21-25, another factor must be considered. By selection of the amount of back iron 18 and path lengths 18A-18D adjacent to each legs 20-25, another control variable is obtained. Depending upon the total flux which is to be driven in the back iron 18, the flux current densities will change as a function of how closely the flux in each individual leg approaches the saturation level of the material. The individual flux for each leg may thus be controlled since a high flux density in one leg diverts the flux to a leg having a lesser flux density.

When the gravity loading is essentially balanced by the force of attraction produced by the permanent magnet 26, the amount of electromagnetic energy required to maintain the equilibrium or centered position is at a minimum. All of the legs are carrying flux of various amounts which automatically produces a centering set of forces co-acting with the force of gravity. Then as the geometric center of the rotating system moves, suitable sensors will sense motion or deviation in the X and Y direction and provide signals which are translated as voltages into current controllers by computer programs. One preferred computer is programmed to take into account the flux levels in each leg and produce a set of optimum currents, and it will continuously (each selected microsecond interval) adjust the currents in each electromagnetic actuator to maintain a centered position of the rotating system.

When the system is essentially in equilibrium a reduced amount of electromagnetic energy is required and the amount of current driving the electromagnetic actuators is at a minimum.

Any mechanical unbalances that develop in the rotor 38 elements are counterbalanced by providing a rotating electromagnetic field which is superimposed onto the main feedback control currents in each of the electromagnetic bearings. Independent rotating fields are provided to each of the electromagnetic bearings 19, and these fields are synchronized with the rotating speed of rotor 38 and are simultaneously adjusted in magnitude and phase in a second computer controller. Thus any mechanical unbalance, whether it be simple radial unbalance or moment unbalance or a combination thereof, that develops in rotor 38 is balanced out by coacting action of the two rotating force fields at the two magnetic bearings.

Dynamic unbalances generally rotate at the same speed as the rotor 38 and are directed radially, sweeping through 360 degrees. The actuators are activated with an open loop controlled rotating force field vector traversing circumferentially from one actuator to the next adjacent actuator. The rotating force field is optimized by changing its amplitude and phase relative to a fixed spot on the rotor 38, and basing the optimization on the peak to peak amplitude of vibration at each bearing position. The dynamic unbalance is thus counteracted by a balancing signal to reduce the mechanical vibratory motion of the rotor 38. Since balancing signals are provided as an open loop controller application which is superimposed onto the feedback controller algorithm, no control instability is initiated by the open loop controller.

The rotating force field is biased to act, in the selected upward direction, under computer control. By this means, the requirement for actuators in the upper two quadrants is eliminated. The actuator field functions to attract the rotor upwardly, and this prevents the rotor from being displaced downwardly from its equilibrium position. Any displacement or motion of the rotor upwardly will be continuously counteracted by gravity thereby limiting upward displacement from equilibrium. Providing a bias with respect to motion of the rotor vertically upwardly from its static equilibrium position reduces the total power dissipated by the magnetic bearings.

The inventive system thus provides a combination of interaction between gravity, the rotating force field, and the feedback loop acting through the actuators to enable the construction of magnetic bearings which incorporate a vertical motion bias and therefore are 1) not symmetrical, 2) are more optimum from a load viewpoint, and 3) may be constructed with actuators eliminated from the top two quadrants.

Referring to FIG. 3, 4 and 5, the journal 28 which is magnetically attracted to the actuators is formed with lamination to reduce eddy current losses. The actuator design and the running speed of the rotor determine whether or not the eddy currents are of sufficient magnitude to require the use of lamination. The actuators 20 are constructed of known efficient materials which produce high flux densities and allow the use of smaller actuators for the same load carrying capabilities.

As described above, the magnetic bearings 19 of the invention are different from the known prior art in that essentially only one-half of a prior art bearing is required. The rotor 38 is not translating relative to the earth and relies on gravity to position the rotor 38 downwardly toward the primary electromagnetic actuator 20. Accordingly, a reduction of the number of actuators, power amplifiers and controllers, is obtained. A second important advantage of the inventive system is that the reduction in the number and size of components saves space and the overall system can be made relatively much smaller to be conveniently placed in small or restricted building areas.

A second embodiment of the inventive system is shown in FIG. 9 wherein a rotor 12 with lamination 33 is mounted internally of a stator 36 in a more conventional motor/generator structure. The operation of the magnetic bearing 19A shown in FIG. 9 is essentially the same as that for the structure of FIG. 8, and the explanation given above relative to the magnetic bearings of FIG. 8 is equally applicable to the structure of FIG. 9. However, the advantages stated above for positioning the rotor externally of the stator obviously are not present in the structure of FIG. 9.

A modification of the embodiment of FIG. 9 is shown in FIG. 10 and comprises a structure wherein the magnetic bearing 19B is divided along the Y axis into two separate sections 48 and 49, essentially identical halves, which are separated by an air gap 47 that is significantly greater than the clearance between radius R3, the radius of face A33, and R2, the radius of the journal lamination. In the embodiment of FIG. 10 the two sections 48 and 49 will operate independently from one another so that the matrix approach for defining the flux paths will be limited to three legs for each half bearing. However, the two sections 48 and 49 will operate together in the sense that a single computer will optimize the responses necessary to minimize the power input and still maintain centered control of the rotating system. It will be obvious to those skilled in the art that the two sections 48 and 49 must be controlled differently to maintain the same clearance between the journal 33 and the several actuator faces A31-A35.

As in the case of the structure of FIG. 8 the polarity of the sets of permanent magnets 58 and 59 may be reversed so long as the polarity of both sets are reversed. As an alternative, the coils in the embodiment of FIG. 10 may be wound such that the same current passes through coils N31 and N32 which are connected so that they produce a north magnetic pole at face A35 and a south magnetic pole at the face A34. The total flux including the flux from the permanent magnet and the flux from the electromagnetic coils is increased at the face A35, and reduced at the face A34. Again by reversing the current flow in the actuators, the force levels can be reversed between the two faces. As the direction of attraction of the lamination 33 by the two faces A34 and A35 are not collinear, the resultant force direction may be controlled. The magnitude of this force may also be controlled by the amount of current driven through the wire pairs N31 and N32. Again, the variation of this force level and its direction is determined in part by the relative angle position of legs 95-100, and the relative dimensions of the legs and of the back iron 83 and 84. In general, the dimensions of the lamination 33, determined by the relation R32 (the outside radius) minus R31 (the inside radius of the lamination) are selected to avoid the possibility of flux saturation.

SENSORS

One or more non-contact sensors, of any suitable known types, indicate the precise location of the rotating components. In the preferred embodiment of FIG. 3, the sensors 60A and 60B are optical sensors which sense two mutually perpendicular directions, such as horizontal vertical directions, or directions 45 degrees off of the horizontal and vertical.

FIG. 3 shows that alternate sensors (generally labelled 29) on leg 20 which act in a vertical direction, and sensors of legs 22 and 24 which act in an off horizontal direction. The system of sensors may be used to sense the horizontal and vertical position of the rotor by means of mathematical transformation of coordinates from the arbitrarily selected angles between the sensors.

Sensors functioning as pairs in a differential mode will minimize non-linearity, drift and noise. Several sets of sensors are used, with suitable known voting and fail safe techniques, to assure that the proper sensor information is obtained.

HOUSING AND AUXILIARY COMPONENTS

The structural components, supports and spacing within the housing 11 are selected to assure the alignment of the rotating elements and stationary elements 16 so that minimal clearances are maintained. Tight or small clearances provide a more efficient system. The housing 11 forms a closed air-tight enclosure. Air is evacuated from the housing 11 to reduce windage loss that is normally associated with any rotating machine. Housing 11 is maintained at a high vacuum by vacuum pump 42. A scavenging surface 38 is provided for the flywheel 12 and the rotating elements include a known type of scavenging surface with striations, such as commonly used in the design of dry gas seals to direct any air particles in housing radially outwardly where they can more readily be removed by the vacuum pump 42. FIG. 3 shows the passageways 51 formed in stator 37 through which cooling fluid is passed. As the complete rotor 38 and stator 37 are contained in evacuated housing 41, one suitable means for cooling the actuators is through conductivity of the structural material to the cooling fluid passing through the passageways 51. A second means for cooling of the rotor 38 is through radiation to outside shell of housing 11 which is temperature controlled by use of cooling fluid.

While the invention has been particularly shown and described with reference to a preferred embodiment thereof, it will be understood by those skilled in the art, that various changes in form and detail can be made therein without departing from the spirit and scope of the invention.

I claim:

1. A flywheel energy storage system comprising, in combination, a rotatable flywheel, said flywheel being mounted to rotate along a horizontal axis, motor/generator means including rotor and stator means, said rotor means being mounted around said stator means and said rotor means being affixed to and rotating with said flywheel, means for coupling electrical power to said motor/generator to drive said rotor and said flywheel to store electrical energy in the form of mechanical kinetic energy therein related to the speed of rotation of said flywheel, magnetic bearing means for operatively suspending said rotor means and said flywheel, electromagnetic actuators for said magnetic bearing means including a single main actuator for supporting the majority of the load weight of said rotor means and said flywheel, and minor actuators for said bearing means for supporting the portion of the load weight not supported by said main actuator and for providing a balancing force to counterbalance initial load unbalances and any dynamic unbalances which may develop in said rotor means and said flywheel.

2. A flywheel system as in claim 1, wherein the rotor means and stator means each have a cylindrical configuration, and wherein the system includes two magnetic bearing means, one of said bearing means being mounted adjacent the ends of said rotor means and stator means, and wherein each bearing means supports essentially one-half of the load weight of said rotor means and said flywheel.

3. A flywheel system as in claim 2, wherein said principle actuators include at least two electrical conductor coils, first power amplifier means, a slow slew rate controller electrically coupled to said first amplifier means, a first of said coils electrically driven by said first power amplifier means and said slow slew rate controller and being energizable to magnetically suspend 80% to 99% of 50% of the gravity load weight of said rotor means and flywheel, second power amplifier means, a high slew rate controller electrically coupled to said second power amplifier, a second of said coils electrically driven by said second power amplifier means and said high slew rate controller to provide a gravity load carrying capability of up to 25% of 50% of the gravity load.

4. A flywheel system as in claim 3 further comprising sensor means for sensing vibration induced in said system and for sensing radial clearances between said rotor means and said stator means, and program providing means, and wherein said slew rate controllers are programmed to minimize the peak vibratory motion.

5. A flywheel system as in claim 3 wherein said actuators are circumferentially mounted around said rotor means, adjustable means for providing an open loop rotating force field to said actuators sequentially and separately from any controls for said high slew rate controller, said adjustable means rotating said force field in synchronism with the rotation of said rotor and optimizing said force field with respect to amplitude and phase for minimizing the peak to peak vibrations at each actuator.

6. A flywheel system as in claim 3, wherein said principal actuators are driven by two separate power amplifiers through a single conductor coil in each said principal actuator.

7. A flywheel system as in claim 2, wherein at least one actuator is devoid of electrical coils, said at least one actuator being in magnetic association with actuators excited by electrical coils and with actuators conducting magnetic fluxes from permanent magnets, wherein said at least one actuator in combination with said actuators conducting magnetic fluxes from permanent magnet and actuators excited by electrical coils selectively produces resulting forces in horizontal directions, vertical directions and a combination thereof.

8. A flywheel system as in claim 3, wherein said principal actuators are aligned to counter the effect of gravity, and wherein said system includes a plurality of lesser actuators which act to trim the effects of unbalance acting in any radial direction by interaction and compensation with gravity forces, said combination of principal actuators and said lesser actuators taken in combination producing an non-symmetric actuator configuration optimized for minimizing the total power consumed by the said hybrid magnetic bearing system.

* * * * *